(12) United States Patent
Iwamura et al.

(10) Patent No.: US 10,252,578 B2
(45) Date of Patent: Apr. 9, 2019

(54) NON-PNEUMATIC TIRE

(71) Applicant: SUMITOMO RUBBER INDUSTRIES, LTD., Kobe-shi (JP)

(72) Inventors: Wako Iwamura, Kobe (JP); Makoto Sugiya, Kobe (JP)

(73) Assignee: SUMITOMO RUBBER INDUSTRIES, LTD., Kobe-shi (JP)

( * ) Notice: Subject to any disclaimer, the term of this patent is extended or adjusted under 35 U.S.C. 154(b) by 218 days.

(21) Appl. No.: 15/279,537

(22) Filed: Sep. 29, 2016

(65) Prior Publication Data

US 2017/0096032 A1 Apr. 6, 2017

(30) Foreign Application Priority Data

Oct. 6, 2015 (JP) ................... 2015-198222

(51) Int. Cl.
| | | |
|---|---|---|
| *B60C 11/03* | (2006.01) | |
| *B60C 7/10* | (2006.01) | |
| *B60C 7/18* | (2006.01) | |

(52) U.S. Cl.
CPC .............. *B60C 11/032* (2013.01); *B60C 7/10* (2013.01); *B60C 7/18* (2013.01); *B60C 11/0302* (2013.01); *B60C 2011/0346* (2013.01); *B60C 2011/0381* (2013.01)

(58) Field of Classification Search
CPC ..... B60C 11/032; B60C 11/0323; B60C 7/00; B60C 7/10
USPC ................................. 152/323–329
See application file for complete search history.

(56) References Cited

U.S. PATENT DOCUMENTS

| | | |
|---|---|---|
| 1,475,094 A | 11/1923 | Tuttle |
| 1,617,870 A | 2/1927 | Snider |
| 2,704,564 A | 3/1955 | Christensen |
| 3,556,190 A | 1/1971 | Riches |
| 4,037,635 A | 7/1977 | Ippen et al. |
| 4,703,787 A | 11/1987 | Ghilardi |
| 2004/0012246 A1* | 1/2004 | Rhyne ................... B60B 1/0223 301/55 |
| 2011/0120610 A1 | 5/2011 | Fugier et al. |
| 2012/0103490 A1 | 5/2012 | Sekine et al. |
| 2014/0090761 A1 | 4/2014 | Foucher et al. |

(Continued)

FOREIGN PATENT DOCUMENTS

| | | | |
|---|---|---|---|
| DE | 102010017702 | * | 1/2012 |
| EP | 0 206 227 A2 | | 12/1986 |
| EP | 0 255 815 A2 | | 2/1988 |

(Continued)

OTHER PUBLICATIONS

English machine translation of DE102010017702. (Year: 2012).*
Extended European Search Report dated Feb. 16, 2017 in Patent Application No. 16191422.1.

*Primary Examiner* — Robert C Dye
(74) *Attorney, Agent, or Firm* — Oblon, McClelland, Maier & Neustadt, L.L.P.

(57) ABSTRACT

A non-pneumatic tire includes a tread ring having an annular form, a hub positioned on a tire radial direction inner side of the tread ring, and multiple spokes connecting the tread ring and the hub. The tread ring has one or more grooves formed on a ground contact surface such that the groove includes a widened portion having an enlarged groove width and a hole penetrating through the tread ring and formed in the widened portion.

20 Claims, 7 Drawing Sheets

(56) References Cited

U.S. PATENT DOCUMENTS

2016/0137004 A1* 5/2016 Quantinet .......... B60C 11/0306
                                                    152/209.2

FOREIGN PATENT DOCUMENTS

| EP | 1 275 527 A2 | 1/2003 |
|----|---|---|
| EP | 2 450 201 A1 | 5/2012 |
| JP | 2-310108 A | 12/1990 |
| JP | 3952211 B1 | 5/2007 |
| JP | 2008-37262 A | 2/2008 |
| JP | 2013-112106 A | 6/2013 |

* cited by examiner

NON-PNEUMATIC TIRE

CROSS-REFERENCE TO RELATED APPLICATIONS

The present application is based upon and claims the benefit of priority to Japanese Patent Application No. 2015-198222, filed Oct. 6, 2015, the entire contents of which are incorporated herein by reference.

BACKGROUND OF THE INVENTION

Field of the Invention

The present invention relates to a non-pneumatic tire that has excellent drainage performance.

Description of Background Art

A non-pneumatic tire may have an annular tread ring, a hub part that is positioned on a tire radial direction inner side of the tread ring, and multiple spokes that connect the tread ring and the hub part. In such a non-pneumatic tire, for example, a hole that penetrates the tread ring may be provided in a ground contact surface of the tread ring. Water between the ground contact surface and the road surface is discharged from the hole (see, for example, Japanese Patent Laid-Open Publication No. 2008-37262). The entire contents of this publication are incorporated herein by reference.

SUMMARY OF THE INVENTION

According to one aspect of the present invention, a non-pneumatic tire includes a tread ring having an annular form, a hub positioned on a tire radial direction inner side of the tread ring, and multiple spokes connecting the tread ring and the hub. The tread ring has one or more grooves formed on a ground contact surface such that the groove includes a widened portion having an enlarged groove width and a hole penetrating through the tread ring and formed in the widened portion.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE EMBODIMENTS

The embodiments will now be described with reference to the accompanying drawings, wherein like reference numerals designate corresponding or identical elements throughout the various drawings.

In the following, a non-pneumatic tire 1 of a first embodiment of the present invention is described with reference to the drawings.

Figure 1:
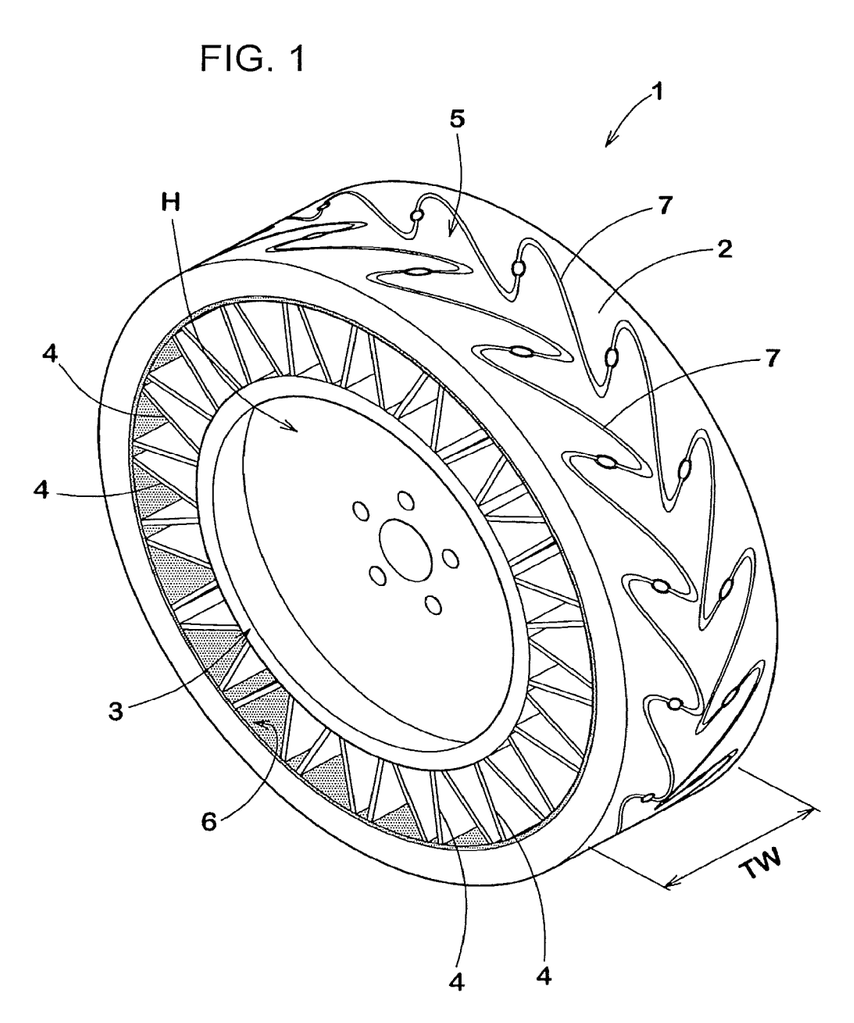
FIG. 1 is a perspective view of a non-pneumatic tire of a first embodiment of the present invention.

FIG. 1 is a perspective view of the non-pneumatic tire (hereinafter, may be simply referred to as a "tire") 1 of the present embodiment. The tire 1 is used, for example, in a passenger car or a vehicle for a heavy load. The tire 1 is capable of supporting a load due to its physical rigidity. Therefore, the tire 1 is different from a pneumatic tire inside which pressurized air is to be filled.

As illustrated in FIG. 1, the tire 1 includes an annular tread ring 2, a hub part 3 that is positioned on a tire radial direction inner side of the tread ring 2, and spokes 4 that connect the tread ring 2 and the hub part 3.

The hub part 3 is an annular body that is continuous in a tire circumferential direction. The hub part 3, for example, has a constant width and thickness in the tire width direction. The hub part 3, for example, is formed of a resin material containing a urethane resin.

Instead of a rim used in a pneumatic tire, a wheel (H) as illustrated in FIG. 1, for example, is fixed in the hub part 3 of the tire 1 of the present embodiment. The wheel (H) is attached to an axle (not illustrated in the drawings) of a vehicle.

The spokes 4 of the present embodiment are each formed in a plate-like shape extending in a tire axial direction. The multiple spokes 4 are provided along the tire circumferential direction. When a vertical load is applied to the axle in the tire circumferential direction, the load is supported by tensile rigidity of the spokes 4 that are positioned above the axle and by compression rigidity of the spokes 4 that are positioned below the axle. The spokes 4, for example, may have a shape that extends in a zigzag manner in the tire radial direction or circumferential direction, or the spokes 4 may have a shape that extends in a mesh-like manner in a circumferential direction cross section of the tire 1.

In order to absorb vibrations when the vehicle is moving and to improve riding comfort, it is preferable that the spokes 4 be formed of, for example, a resin material or a rubber material such as a urethane resin.

The tread ring 2 is an annular body that is continuous in the tire circumferential direction. The tread ring 2 is formed of, for example, a resin or rubber material.

The tread ring 2, for example, is concentrically positioned with the hub part 3, and has a constant tire axial direction width (TW).

The tread ring 2 of the present embodiment has a ground contact surface 5 that is in contact with a road surface, and has an inward surface 6 that is on an opposite side of the ground contact surface 5 and faces the hub part 3 side.

Figure 2:
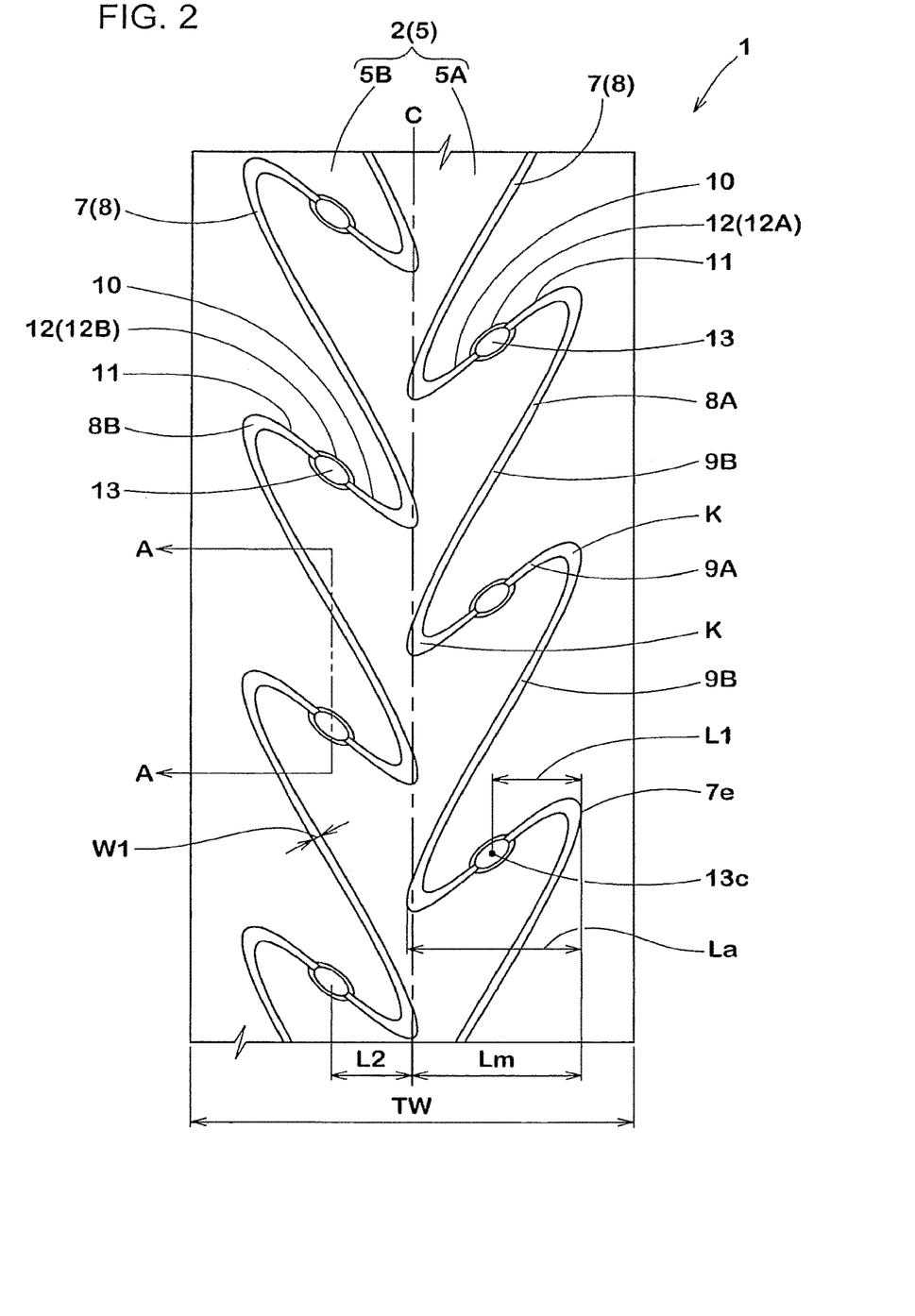
FIG. 2 is a developed view of a ground contact surface in FIG. 1.

As illustrated in FIG. 2, the ground contact surface 5 has a first ground contact surface (5A) on one side of a tire equator (C) (in FIG. 2, on a right side of the tire equator (C)) and a second ground contact surface (5B) on the other side of the tire equator (C) (in FIG. 2, on a left side of the tire equator (C)).

At least one groove 7 is provided in the ground contact surface 5. When the tire runs on a wet road surface, the groove 7 removes water on the road surface and improves wet performance.

The groove 7 of the present embodiment includes a first portion 10, a second portion 11, and a widened portion 12 that is provided between the first portion 10 and the second portion 11.

The widened portion 12 is a portion that has a locally enlarged groove width as compared to the first and second portions (10, 11). Such a widened portion 12 can remove more water described above. As a result, the wet performance can be further improved.

A hole 13 that penetrates the tread ring 2 is formed in the widened portion 12. As a result, water flowed into the widened portion 12 via the first portion 10 or the second portion 11 can be discharged from the hole 13 to an inner side of the tread ring 2. Further, since the widened portion 12 has a larger width than the first and second portions (10, 11), a flow speed of the water in the groove 7 is slowed. Therefore, the water in the widened portion 12 can be effectively discharged from the hole 13. Therefore, the tire 1 according to an embodiment of the present invention can achieve excellent wet performance.

Figure 3:
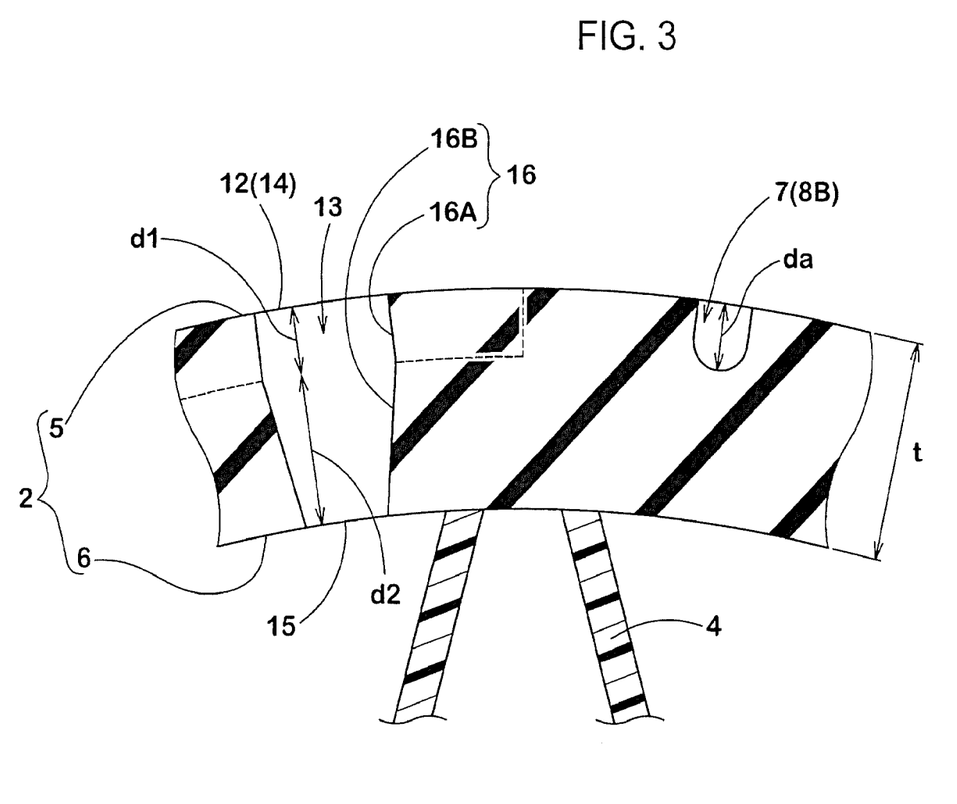
FIG. 3 illustrates a cross-sectional view along a line A-A in FIG. 2.

As illustrated in FIG. 3, the hole 13 penetrates the ground contact surface 5 and the inward surface 6. The hole 13 has a first opening part 14 that opens at the ground contact surface 5 and a second opening part 15 that opens at the inward surface 6.

Figure 4:
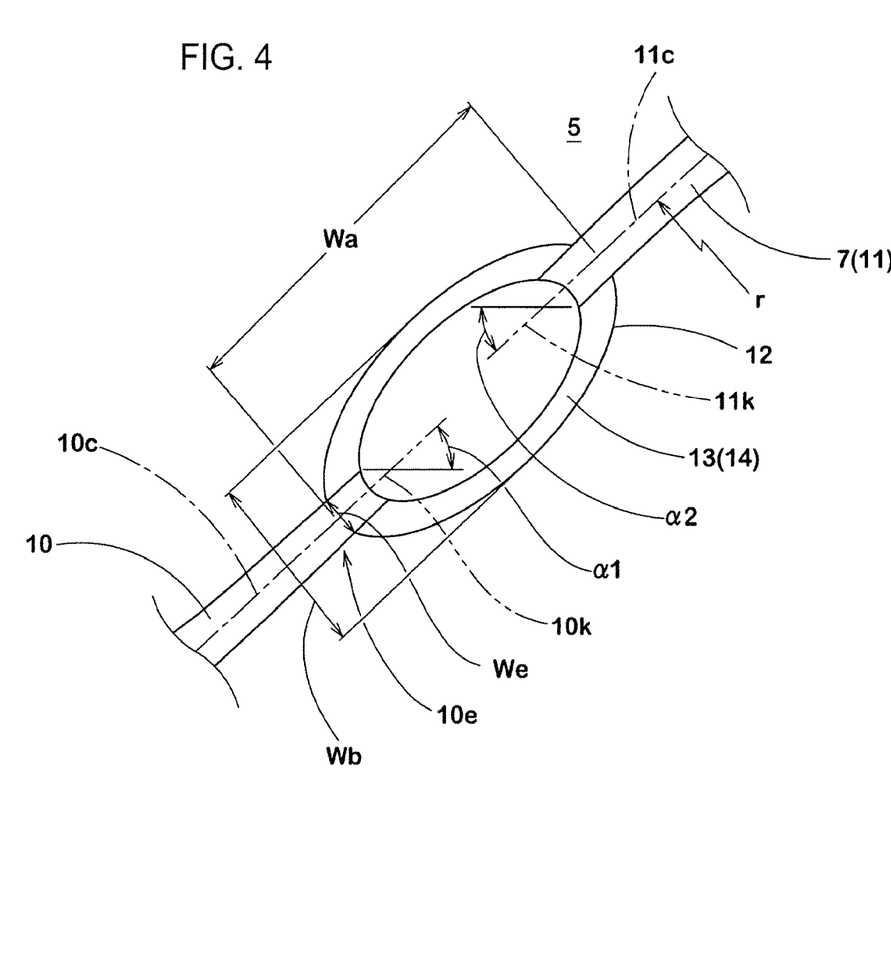
FIG. 4 is an enlarged view of a widened portion.

As illustrated in FIG. 4, for example, the first opening part 14 is formed such that a length (Wa) of the first opening part 14 along a longitudinal direction of the groove 7 is larger than a length (Wb) of the first opening part 14 along a width direction of the groove 7. Such a first opening part 14 allows a high rigidity of the tread ring 2 near the widened portion 12 to be maintained and thus improves durability performance. In order to effectively achieve the above-described effect, it is desirable that the length (Wa) of the first opening part 14 along the longitudinal direction be about 1.3-2.2 times the length (Wb) of the first opening part 14 along the width direction. Further, it is desirable that the length (Wb) of the first opening part 14 in the width direction be about 2-5 times a width (We) of the groove at an end part (10e) of the first portion 10 where the widened portion 12 and the first portion 10 connect to each other.

In the present embodiment, the first opening part 14 is formed in a substantially elliptical shape. This allows the tread ring 2 to maintain a high rigidity.

A shape of the second opening part 15 (illustrated in FIG. 3) is not particularly limited. However, from a point of view of maintaining a high rigidity of the tread ring 2, it is desirable that the shape of the second opening part 15 be a substantially elliptical shape similar to the shape of the first opening part 14 or be a circular shape. Since it is desirable that the hole 13 be formed using a mold, a shape that makes removal from the mold difficult is avoided.

In order to improve the durability performance of the tread ring while maintaining the wet performance, it is desirable that a ratio (Si/So) of an area (Si) of the second opening part 15 of the hole 13 to an area (So) of the first opening part 14 of the hole 13 be 0.3 or more and 0.9 or less. When the ratio (Si/So) exceeds 0.9, removal from a mold may become difficult. Further, from the same point of view, the area (So) of the first opening part 14 is desirably 0.5 $cm^2$ or more and is more desirably 1.5 $cm^2$ or more, and is desirably 4.5 $cm^2$ or less and is more desirably 3.5 $cm^2$ or less.

As illustrated in FIG. 3, the hole 13 has an inner side surface 16 that extends from the first opening part 14 to the second opening part 15. In the present embodiment, the inner side surface 16 includes a first inner side surface (16A) and a second inner side surface (16B), the first inner side surface (16A) extending perpendicularly with respect to the ground contact surface 5 from the first opening part 14 toward the tire radial direction inner side, the second inner side surface (16B) having a tapered shape of which an opening area is gradually reduced toward the second opening part 15. The hole 13 having such an inner side surface 16 allows the tread ring 2 to maintain a high rigidity on the inward surface 6 side while ensuring a sufficient value of the hole 13.

It is desirable that a depth (d2) of the second inner side surface (16B) be larger than a depth (d1) of the first inner side surface (16A). This allows the tread ring 2 to maintain a high rigidity since the second inner side surface (16B) has a gentle slope. When the depth (d2) of the second inner side surface (16B) is excessively larger than the depth (d1) of the first inner side surface (16A), there is a risk that the volume at the widened portion 12 is reduced. Therefore, it is preferable that a ratio (d2/d1) of the depth (d2) of the second inner side surface (16B) to the depth (d1) of the first inner side surface (16A) be 1.5-2.0.

As illustrated in FIG. 2, multiple widened portions 12, in each of which a hole 13 is formed, are provided along the tire circumferential direction in each of the first ground contact surface (5A) and the second ground contact surface (5B). As a result, water can be uniformly discharged on both sides of the tire equator (C) and thus the wet performance can be further improved.

From the point of view of effectively achieving the above-described effect, in a ground contact region in which the ground contact surface 5 is in contact with a road surface, it is desirable that 0.3-10 widened portions 12 in each of which a hole 13 is formed be positioned, and it is more desirable that 1-8 widened portions 12 be formed.

It is desirable that the widened portions 12 in each of which a hole 13 is provided be provided in a tire axial direction central portion of the groove 7. This allows water in the groove to be more smoothly discharged. From this point of view, it is desirable that a tire axial direction length (L1) between a center (13c) of the hole 13 and a tire axial direction outer edge (7e) of the groove 7 be 40%-60% of a tire axial direction length (La) of the groove 7.

In order to smoothly discharge water on a road surface while allowing the tread ring 2 to maintain a high rigidity, it is desirable that a tire axial direction distance (L2) between the hole 13 and the tire equator (C) be 10%-30% of the tire axial direction width (TW) of the tread ring 2.

It is desirable that such a hole 13 be provided without exposing, for example, a cord covering rubber material, in particular, cords of the cord covering rubber material, such as a belt ply (not illustrated in the drawings) that forms the tread ring 2. That is, it is desirable that the hole 13 be formed using resin such as rubber or urethane. As a result, deterioration of the cords due to water or moisture in the air can be suppressed, thereby improving the durability performance of the tread ring 2.

In the present embodiment, the first portion 10 is provided on a tire axial direction inner side of the widened portion 12. In the present embodiment, the second portion 11 is provided on a tire axial direction outer side of the widened portion 12.

In the present embodiment, the first portion 10 and the second portion 11 are formed such that they are substantially linearly continuous. In such an embodiment, water in the first portion 10 and the second portion 11 smoothly flows into the widened portion 12, and thus wet performance is maintained. As illustrated in FIG. 4, the meaning of the term "substantially linear" includes of course a case where an imaginary extension line (10k) of the first portion 10 and an imaginary extension line (11k) of the second portion 11 overlap on a straight line, and also includes the following case. That is, the meaning of the term "substantially linear" also includes a case where the imaginary extension lines (10k, 11k) each extend in an arc shape of a curvature radius (r) of 150 mm or more and an absolute value |α1−α2| of a difference between angles (α1, α2) of the imaginary extension lines (10k, 11k) with respect to the tire axial direction is 5 degrees or less. The imaginary extension line (10k) of the first portion 10 is an imaginary line that is formed by smoothly extending a groove center line (10c), which is a width direction center of the first portion 10, to the widened portion 12 side. The imaginary extension line (11k) of the second portion 11 is an imaginary line that is formed by smoothly extending a groove center line (11c) of the second portion 11 to the widened portion 12 side.

The groove 7 of the present embodiment, for example, is a circumferential direction groove 8 that continuously extend in the tire circumferential direction. In the present embodiment, the circumferential direction groove 8 includes a circumferential direction groove (8A) on one side mainly provided in the first ground contact surface (5A) and a circumferential direction groove (8B) on the other side mainly provided in the second ground contact surface (5B).

In the present embodiment, the circumferential direction grooves (8A, 8B) are each formed in a zigzag shape in which first inclined portions (9A) and second inclined portions (9B) are alternately formed along the tire circumferential direction, the second inclined portions (9B) having a larger tire circumferential direction length than the first inclined portions (9A). The first inclined portions (9A), for example, are inclined toward a tire axial direction outer side on one side of the tire circumferential direction. In the present embodiment, the second inclined portions (9B), for example, are inclined toward a tire axial direction outer side on one side of the tire circumferential direction. Such a circumferential direction groove 8 can have a long groove length and thus can remove more water. In the present embodiment, the second inclined portions (9B) are connected to the first inclined portions (9A) by smooth arc-shaped bent portions (K). This allows water in the circumferential direction groove 8 to flow smoothly.

In the present embodiment, the holes 13 are provided in the first inclined portions (9A) that have a shorter tire circumferential direction length as compared to the second inclined portions (9B). Therefore, the bent portions (K) of the groove 7 limit the amount of water flowing into the widened portions 12 and thus water can be more smoothly discharged from the holes 13.

Widened portions (12A) of the first ground contact surface (5A) and widened portions (12B) of the second ground contact surface (5B) are shifted from each other's positions in the tire circumferential direction. This allows a decrease in the rigidity of the tread ring 2 in the tire axial direction due to that the widened portions 12 and the holes 13 are provided to be suppressed. In order to effectively achieve such an effect, it is desirable that the widened portions (12A) in the first ground contact surface (5A) and the widened portions (12B) in the second ground contact surface (5B) be provided at the same pitch and be formed with their phases shifted from each other by a half pitch in the tire circumferential direction.

The position of the groove 7 is not particularly limited. In the present embodiment, the tire axial direction outer edge (7e) of the groove 7 is provided at a position that is 30% or more of the tire axial direction width (TW) of the tread ring 2 away from the tire equator (C). That is, when a tire axial direction distance (Lm) between the outer edge (7e) of the groove 7 and the tire equator (C) is less than 30% of the width (TW) of the tread ring 2, there is a risk that water in two outer-side portions of the ground contact surface 5 in the tire axial direction is not discharged so that the wet performance deteriorates.

It is desirable that a groove width (W1) of the groove 7 excluding the widened portions 12 be 1 mm or more and be 5% or less of the width (TW) of the tread ring 2. Further, it is desirable that a groove depth (da) of the groove 7 be 20%-45% of a thickness (t) of the tread ring 2. This allows the wet performance and the durability performance to be improved in a well-balanced manner.

Figure 5:
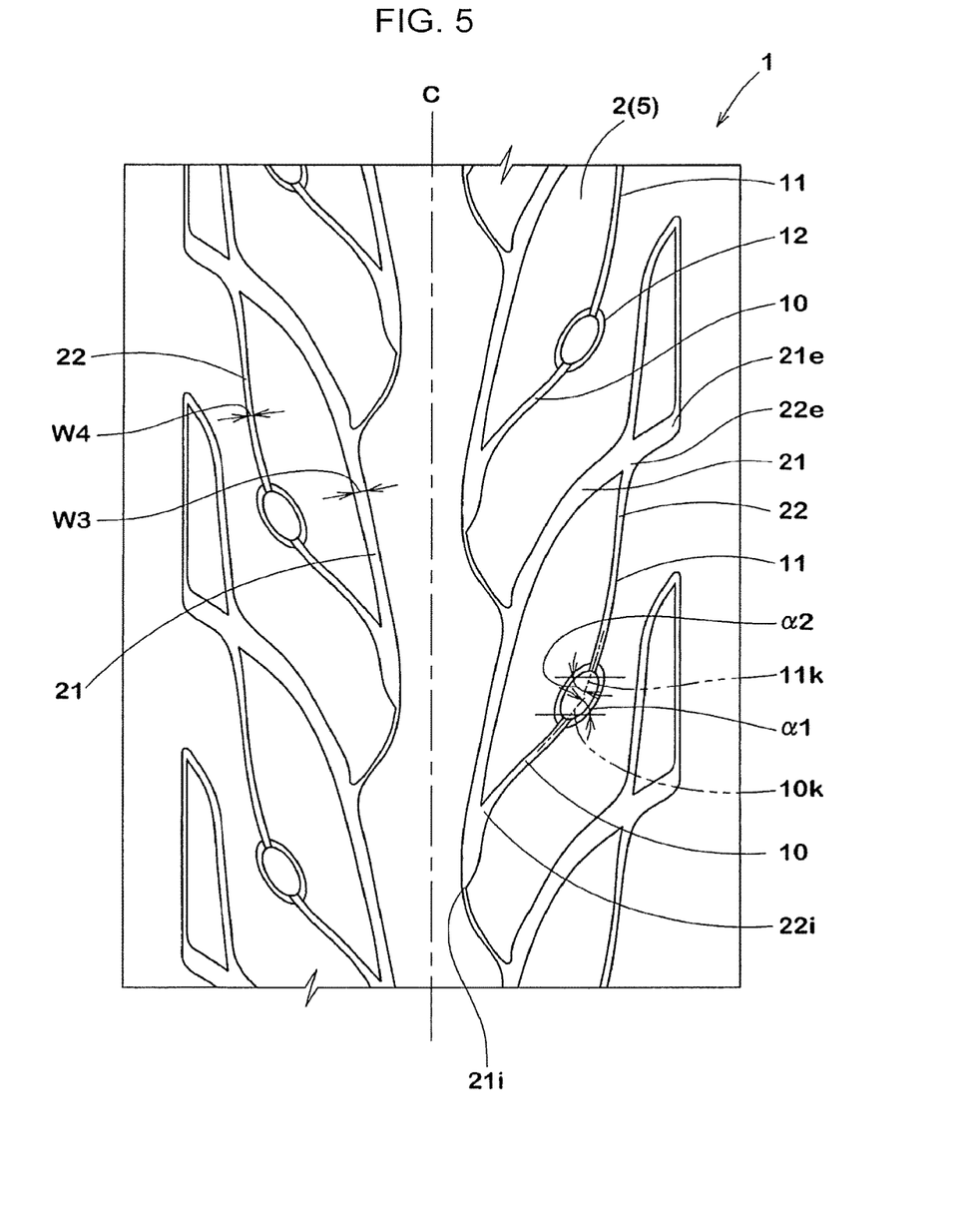
FIG. 5 is a developed view of a ground contact surface of a non-pneumatic tire of a second embodiment of the present invention.

FIG. 5 is a developed view of a ground contact surface 5 of a tread ring 2 of a second embodiment. Description about a structure that is the same as a structure illustrated in FIG. 1-4 is omitted. In the second embodiment, a groove 7 includes a lug groove 20 that terminates in the ground contact surface 5. The lug groove 20 of the present embodiment includes a lug groove (20A) on one side provided in a first ground contact surface (5A) and a lug groove (20B) on the other side provided in a second ground contact surface (5B).

The lug grooves (20A, 20B) each include a first lug groove 21 and a second lug groove 22. The first lug groove 21 continuously extends on one side of the tire circumferential direction from a tire axial direction inner edge (21i) to a tire axial direction outer edge (21e). The second lug groove 22 continuously extends on one side of the tire circumferential direction toward a tire axial direction outer side, a tire axial direction inner edge (22i) and a tire axial direction outer edge (22e) of the second lug groove 22 being communicatively connected to the first lug groove 21.

The second lug groove 22 includes a first portion 10, a second portion 11, and a widened portion 12 that is provided between the first portion 10 and the second portion 11. The first portion 10 and the second portion 11 are formed in directions that intersect each other. As a result, in the widened portion 12, a flow speed of water flowing in from the first portion 10 and the second portion 11 of the groove is slowed and thus the water can be more smoothly discharged from the hole 13 of the widened portion 12, thereby improving the wet performance. The term "directions that intersect each other" refers to a state in which an absolute value |α1−α2| of a difference between an angle (α1) of the imaginary extension line (10k) of the first portion 10 with respect to the tire axial direction and an angle (α2) of the imaginary extension line (11k) of the second portion 11 with respect to the tire axial direction is more than 5 degrees and is equal to or less than 50 degrees.

A groove width (W4) of the second lug groove 22 is smaller than a groove width (W3) of the first lug groove 21. Such a second lug groove 22 allows a decreased in the rigidity of the tread ring 2 to be suppressed and allows water in the second lug groove 22 to be effectively discharged from the hole 13. The first lug groove 21 having a large groove width allows more water to be accumulated in the groove and allows the water in the groove to be discharged to a later grounding side in a tire rotation direction. When the groove width (W4) of the second lug groove 22 is large, there is a risk that the rigidity of the tread ring 2 decreases and the durability performance deteriorates. Further, when the groove width (W4) of the second lug groove 22 is excessively small, there is a risk that the water cannot be effectively discharged. From such a point of view, it is desirable that the groove width (W4) of the second lug groove 22 be 50%-80% of the groove width (W3) of the first lug groove 21.

Figure 6:
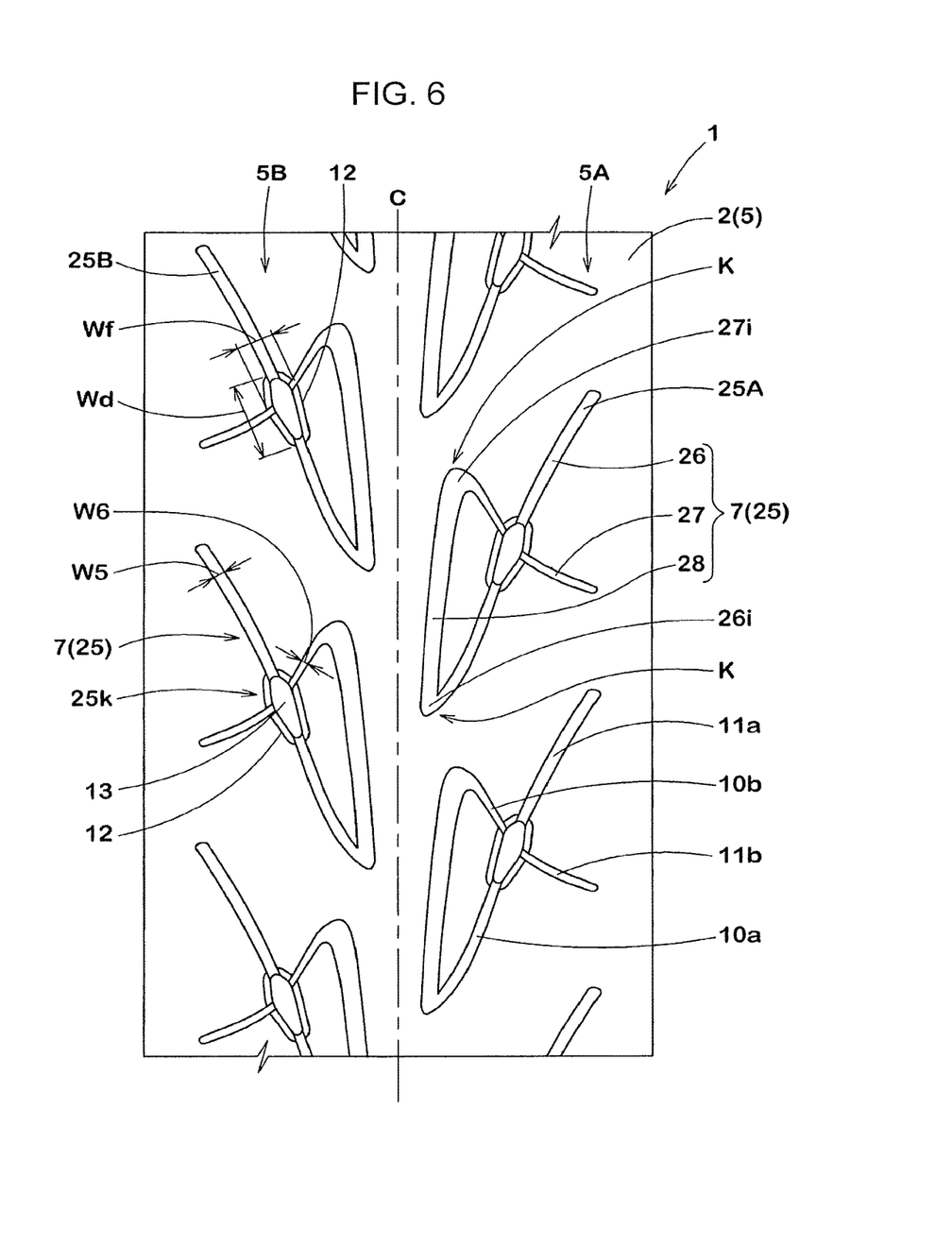
FIG. 6 is a developed view of a ground contact surface of a non-pneumatic tire of a third embodiment of the present invention.

FIG. 6 is a developed view of a ground contact surface 5 of a tread ring 2 of a third embodiment. Description about a structure that is the same as a structure illustrated in FIG. 1-4 is omitted. In the third embodiment, a groove 7 is formed as an intersecting groove in which two grooves intersect each other. The intersecting groove 25 of the present embodiment includes an intersecting groove (25A) on one side provided in a first ground contact surface (5A) and an intersecting groove (25B) on the other side provided in a second ground contact surface (5B).

The intersecting grooves (25A, 25B) each include a first groove 26, a second groove 27 and a third groove 28. The first groove 26 is inclined toward a tire axial direction outer side on one side with respect to the tire circumferential direction. The second groove 27 is inclined in a direction opposite to the first groove 26 and intersects the first groove 26. The third groove 28 connects to a tire axial direction inner edge (26i) of the first groove 26 and to a tire axial direction inner edge (27i) of the second groove 27 via smooth bent portions (K). Such an intersecting groove 25 allows water in the first groove 26, the second groove 27 and the third groove 28 to freely flow back and forth in the grooves and thus allows the water to be effectively removed.

The intersecting groove 25 has a cross-shaped intersecting portion (25K) in which the first groove 26 and the second groove 27 intersect each other. It is also possible that the first groove 26 and the second groove 27 intersect each other such that the intersecting portion (25K) has a T-shape.

The widened portion 12 is provided in the intersecting portion (25K). As a result, water in the first groove 26 and water in the second groove 27 can be effectively discharged from the widened portion 12 using the hole 13 and thus, excellent wet performance can be achieved.

A groove width (W5) of the first groove 26 is larger than a groove width (W6) of the second groove 27. Further, the widened portion 12 is formed such that a length (Wd) of the widened portion 12 along the first groove 26 is larger than a length (Wf) of the widened portion 12 along the second groove 27. Such a widened portion 12 allows a flow speed of water in the first groove 26 (in which more water flows) to be slowed and allows the water to be effectively removed, and thus allows more excellent wet performance to be achieved.

In the present embodiment, the first groove 26 has a wide first portion (10a) that is provided on a tire axial direction inner side of the widened portion 12 and a wide second portion (11a) that is provided on a tire axial direction outer side of the widened portion 12. In the present embodiment, the wide first portion (10a) and the wide second portion (11a) are formed such that they are substantially linearly continuous.

In the present embodiment, the second groove 27 has a narrow first portion (10b) that is provided on a tire axial direction inner side of the widened portion 12 and a narrow second portion (11b) that is provided on a tire axial direction outer side of the widened portion 12. In the present embodiment, the narrow first portion (10b) and the narrow second portion (11b) are formed in directions that intersect each other.

EXAMPLES

Non-pneumatic tires having the basic structure illustrated in FIG. 1 are prototyped based on specifications illustrated in Table 1, and durability performance and wet performance of the prototyped tires are tested. Common specifications are as follows.

Tire Size: Corresponding to 125/80R13

Groove Depth (da): 6.0 mm

Tread Ring Thickness (t): 19.4 mm

Wet Performance

An inside drum testing machine, in which an inner peripheral surface of a drum is a running surface of a tire, is used, and each of the prototyped tires is run on the running surface of the drum in a wet state under the following conditions. Hard braking is activated when a speed is 65 km/h, and a breaking distance in which the speed is reduced from 60 km/h to 20 km/h is measured. The result is an inverse number of the breaking distance, and is expressed as an index number with a value of a comparative example 1 as 100. The larger the index number, the better the result.

Water Depth: 0.5-2.0 mm

Running Surface: Pseudo Asphalt

Load: 1.5 kN

Durability Performance

The above-described drum testing machine is used and each of the prototyped tires is run under the following conditions, and a mileage until a failure such as a crack or a chip occurs in the ground contact surface of the tire is measured. The result is expressed as an index number with a mileage of a comparative example 1 as 100. A mileage of 1.5 times the mileage of the comparative example 1 is used as an upper limit. The larger the index number, the better the result.

Load: 1.5 kN

Speed: 60 km/h

The test results are illustrated in Table 1.

TABLE 1

Figure 7:
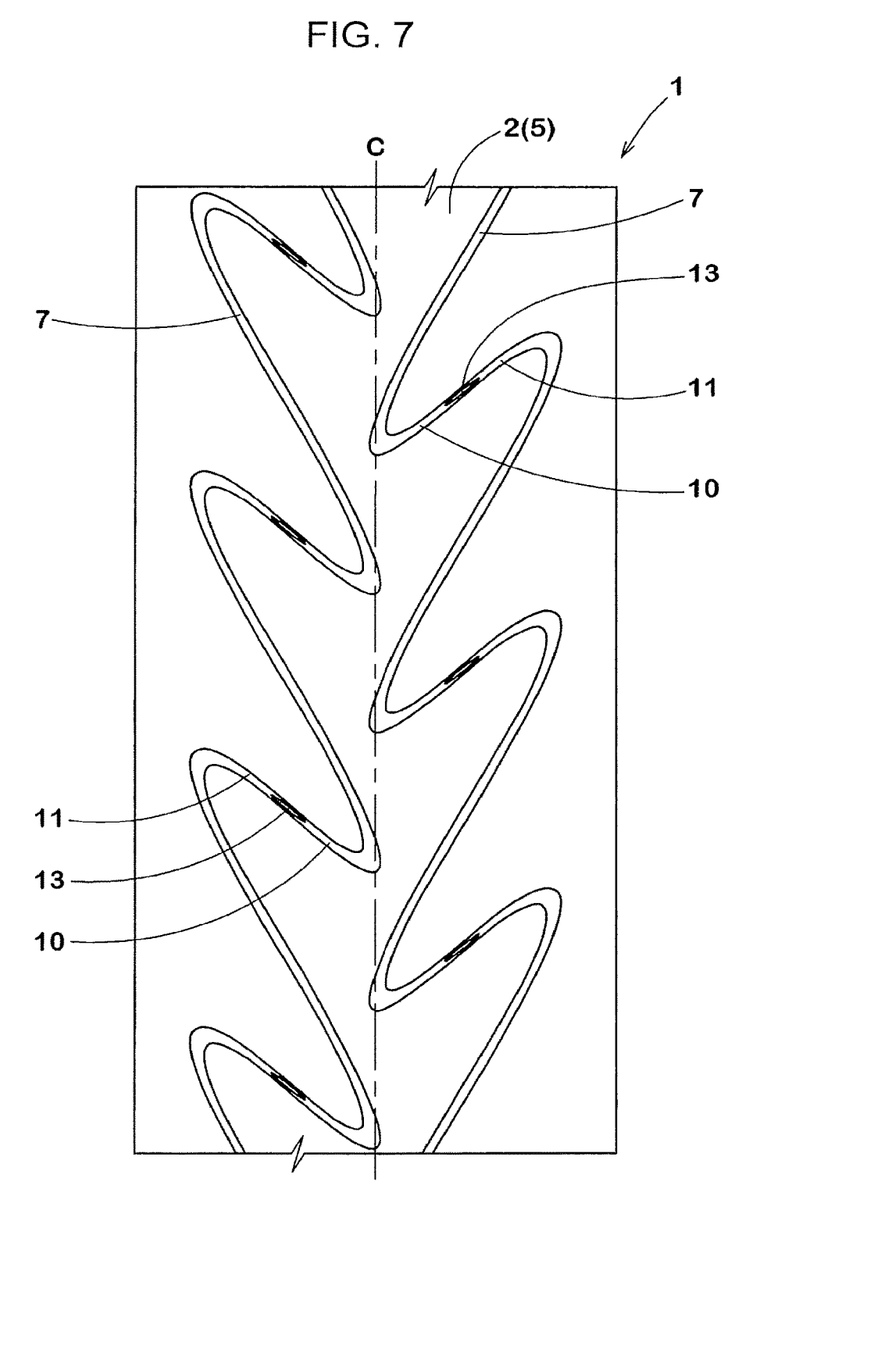
FIG. 7 is a developed view of a ground contact surface of a non-pneumatic tire of a comparative example.

|  | Comparative Example 1 | Example 1 | Example 2 | Example 3 | Example 4 | Example 5 | Example 6 | Example 7 | Example 8 |
|---|---|---|---|---|---|---|---|---|---|
| Figure illustrating shape of tread part | FIG. 7 | FIG. 1 | FIG. 1 | FIG. 1 | FIG. 1 | FIG. 1 | FIG. 1 | FIG. 1 | FIG. 1 |
| Ratio (Wb/We) of width of first opening part to groove width of first portion | 1.0 | 3.5 | 1.5 | 2.0 | 5.0 | 5.5 | 3.5 | 3.5 | 3.5 |
| Ratio (Wa/Wb) of length to width of first opening part | — | 1.7 | 1.7 | 1.7 | 1.7 | 1.7 | 0.8 | 1.3 | 2.2 |
| Tire axial direction position of hole (L2/TW) (%) | 20 | 20 | 20 | 20 | 20 | 20 | 20 | 20 | 20 |
| Area (So) of first opening part (cm$^2$) | 2.0 | 2.0 | 2.0 | 2.0 | 2.0 | 2.0 | 2.0 | 2.0 | 2.0 |
| Area (Si) of second opening part (cm$^2$) | 1.5 | 1.5 | 1.5 | 1.5 | 1.5 | 1.5 | 1.5 | 1.5 | 1.5 |
| Drainage performance (index number; larger value | 100 | 120 | 115 | 118 | 120 | 121 | 120 | 121 | 118 |

TABLE 1-continued

| | | | | | | | | | |
|---|---|---|---|---|---|---|---|---|---|
| is better) | | | | | | | | | |
| Durability (index number; larger value is better) | 100 | 98 | 100 | 100 | 98 | 96 | 96 | 97 | 98 |

| | Example 9 | Example 10 | Example 11 | Example 12 | Example 13 | Example 14 | Example 15 | Example 16 | Example 17 |
|---|---|---|---|---|---|---|---|---|---|
| Figure illustrating shape of tread part | FIG. 1 | FIG. 1 | FIG. 1 | FIG. 1 | FIG. 1 | FIG. 1 | FIG. 1 | FIG. 5 | FIG. 6 |
| Ratio (Wb/We) of width of first opening part to groove width of first portion | 3.5 | 3.5 | 3.5 | 3.5 | 3.5 | 3.5 | 3.5 | 3.5 | 3.5 |
| Ratio (Wa/Wb) of length to width of first opening part | 2.4 | 1.7 | 1.7 | 1.7 | 1.7 | 1.7 | 1.7 | 1.7 | 1.7 |
| Tire axial direction position of hole (L2/TW) (%) | 20 | 10 | 30 | 20 | 20 | 20 | 20 | 20 | 20 |
| Area (So) of first opening part (cm$^2$) | 2.0 | 2.0 | 2.0 | 2.0 | 2.0 | 2.0 | 2.0 | 2.0 | 2.0 |
| Area (Si) of second opening part (cm$^2$) | 1.5 | 1.5 | 1.5 | 0.5 | 0.6 | 1.8 | 2.0 | 1.5 | 1.5 |
| Drainage performance (index number; larger value is better) | 116 | 117 | 117 | 115 | 118 | 121 | 122 | 123 | 123 |
| Durability (index number; larger value is better) | 99 | 98 | 98 | 100 | 99 | 97 | 95 | 97 | 97 |

As a result of the tests, it is confirmed that the tires of the examples have better wet performance as compared to the tire of the comparative example. Further, it is confirmed that durability performance can be improved by improving the positions and the shapes of the holes and grooves.

A non-pneumatic tire according to an embodiment of the present invention includes an annular tread ring, a hub part that is positioned on a tire radial direction inner side of the tread ring and multiple spokes that connect the tread ring and the hub part. At least one groove is provided in the tread ring on a ground contact surface side, the ground contact surface being in contact with a road surface. The groove includes a widened portion that is formed by partially enlarging a groove width. A hole that penetrates the tread ring is formed in the widened portion.

It is desirable that, in a non-pneumatic tire according to an embodiment of the present invention, in the ground contact surface, a length of the hole along a longitudinal direction of the groove be longer than a length of the hole along a width direction of the groove.

It is desirable that, in a non-pneumatic tire according to an embodiment of the present invention, the groove include a first portion, a second portion, and the widened portion that is provided between the first portion and the second portion, and the first portion and the second portion be formed such that they are substantially linearly continuous.

It is desirable that, in a non-pneumatic tire according to an embodiment of the present invention, the groove include a first portion, a second portion, and the widened portion that is provided between the first portion and the second portion, and the first portion and the second portion be formed in directions that intersect each other.

It is desirable that, in a non-pneumatic tire according to an embodiment of the present invention, the groove include a first groove and a second groove that intersects the first groove, and the widened portion be provided in an intersecting portion of the first groove and the second groove.

It is desirable that, in a non-pneumatic tire according to an embodiment of the present invention, a groove width of the first groove be larger than a groove width of the second groove, and a length of the widened portion along the first groove be longer than a length of the widened portion along the second groove.

It is desirable that, in a non-pneumatic tire according to an embodiment of the present invention, the ground contact surface include a first ground contact surface on one side of a tire equator and a second ground contact surface on the other side of the tire equator, multiple widened portions, in each of which a hole is formed, be provided in each of the first ground contact surface and the second ground contact surface along a tire circumferential direction, and the widened portions of the first ground contact surface the widened portions of the second ground contact surface be shifted from each other's positions in the tire circumferential direction.

A non-pneumatic tire according to an embodiment of the present invention has a tread ring having a ground contact surface to be in contact with a road surface and at least one groove provided in the tread ring on the ground contact surface side. Such a groove allows water on the road surface to be removed and thus wet performance is improved. The groove includes the widened portion formed by partially enlarging the groove width. Such a widened portion allows more water to be removed. The hole that penetrates the tread ring is formed in the widened portion. As a result, water flowed into the widened portion via the groove can be discharged from the hole to an inner side of the tread ring. In particular, the widened portion slows flow of the water in the groove and thus allows the water to be smoothly discharged from the hole. Therefore, a non-pneumatic tire according to an embodiment of the present invention can achieve excellent wet performance.

Obviously, numerous modifications and variations of the present invention are possible in light of the above teachings. It is therefore to be understood that within the scope of the appended claims, the invention may be practiced otherwise than as specifically described herein.

The invention claimed is:

1. A non-pneumatic tire, comprising:
a tread ring having an annular form;
a hub positioned on a tire radial direction inner side of the tread ring; and
a plurality of spokes connecting the tread ring and the hub, wherein the tread ring has at least one groove formed on a ground contact surface such that the at least one groove includes a widened portion having an enlarged groove width and a hole penetrating through the tread ring in a tire radial direction and formed in the widened portion.

2. The non-pneumatic tire according to claim 1, wherein the hole is formed in the ground contact surface such that the hole has a length along a longitudinal direction of the at least one groove which is longer than a length along a width direction of the at least one groove.

3. The non-pneumatic tire according to claim 2, wherein the at least one groove includes a first portion, a second portion and the widened portion such that the widened portion is formed between the first portion and the second portion and that the first portion and the second portion are formed substantially linearly continuous.

4. The non-pneumatic tire according to claim 3, wherein the ground contact surface includes a first ground contact surface on one side of a tire equator and a second ground contact surface on the other side of the tire equator such that each of the first ground contact surface and the second ground contact surface has the widened portion formed in a plurality and the hole formed in a plurality along a tire circumferential direction and that the plurality of widened portions in the first ground contact surface and the plurality of widened portions in the second ground contact surface are shifted from each other's positions in the tire circumferential direction.

5. The non-pneumatic tire according to claim 3, wherein the at least one groove includes a first portion, a second portion and the widened portion such that the widened portion is formed between the first portion and the second portion and that the first portion and the second portion are formed in directions intersecting each other.

6. The non-pneumatic tire according to claim 5, wherein the ground contact surface includes a first ground contact surface on one side of a tire equator and a second ground contact surface on the other side of the tire equator such that each of the first ground contact surface and the second ground contact surface has the widened portion fix tied in a plurality and the hole formed in a plurality along a tire circumferential direction and that the plurality of widened portions in the first ground contact surface and the plurality of widened portions in the second ground contact surface are shifted from each other's positions in the tire circumferential direction.

7. The non-pneumatic tire according to claim 3, wherein the at least one groove includes a first groove and a second groove intersecting the first groove such that the at least one groove has an intersecting portion of the first groove and the second groove, and the widened portion is formed in the intersecting portion of the first groove and the second groove.

8. The non-pneumatic tire according to claim 7, wherein the first and second grooves are formed such that the first groove has a groove width which is larger than a groove width of the second groove and that the widened portion has a length along the first groove which is longer than a length along the second groove.

9. The non-pneumatic tire according to claim 8, wherein the around contact surface includes a first ground contact surface on one side of a tire equator and a second ground contact surface on the other side of the tire equator such that each of the first ground contact surface and the second ground contact surface has the widened portion formed in a plurality and the hole formed in a plurality along a tire circumferential direction and that the plurality of widened portions in the first ground contact surface and the plurality of widened portions in the second ground contact surface are shifted from each other's positions in the tire circumferential direction.

10. The non-pneumatic tire according to claim 7, wherein the ground contact surface includes a first ground contact surface on one side of a tire equator and a second ground contact surface on the other side of the tire equator such that each of the first ground contact surface and the second ground contact surface has the widened portion formed in a plurality and the hole foamed in a plurality along a tire circumferential direction and that the plurality of widened portions in the first ground contact surface and the plurality of widened portions in the second ground contact surface are shifted from each other's positions in the tire circumferential direction.

11. The non-pneumatic tire according to claim 3, wherein the around contact surface includes a first ground contact surface on one side of a tire equator and a second ground contact surface on the other side of the tire equator such that each of the first ground contact surface and the second ground contact surface has the widened portion formed in a plurality and the hole formed in a plurality along a tire circumferential direction and that the plurality of widened portions in the first ground contact surface and the plurality of widened portions in the second ground contact surface are shifted from each other's positions in the tire circumferential direction.

12. The non-pneumatic tire according to claim 1, wherein the at least one groove includes a first portion, a second portion and the widened portion such that the widened portion is formed between the first portion and the second portion and that the first portion and the second portion are formed substantially linearly continuous.

13. The non-pneumatic tire according to claim 12, wherein the ground contact surface includes a first ground contact surface on one side of a tire equator and a second ground contact surface on the other side of the tire equator such that each of the first ground contact surface and the second ground contact surface has the widened portion formed in a plurality and the hole formed in a plurality along a tire circumferential direction and that the plurality of widened portions in the first ground contact surface and the plurality of widened portions in the second ground contact surface are shifted from each other's positions in the tire circumferential direction.

14. The non-pneumatic tire according to claim 1, wherein the at least one groove includes a first portion, a second portion and the widened portion such that the widened portion is formed between the first portion and the second portion and that the first portion and the second portion are formed in directions intersecting each other.

15. The non-pneumatic tire according to claim 14, wherein the ground contact surface includes a first ground contact surface on one side of a tire equator and a second ground contact surface on the other side of the tire equator such that each of the first ground contact surface and the second ground contact surface has the widened portion formed in a plurality and the hole formed in a plurality along a tire circumferential direction and that the plurality of widened portions in the first ground contact surface and the plurality of widened portions in the second ground contact surface are shifted from each other's positions in the tire circumferential direction.

16. The non-pneumatic tire according to claim 1, wherein the at least one groove includes a first groove and a second groove intersecting the first groove such that the at least one groove has an intersecting portion of the first groove and the second groove, and the widened portion is formed in the intersecting portion of the first groove and the second groove.

17. The non-pneumatic tire according to claim 16, wherein the first and second grooves are formed such that the first groove has a groove width which is larger than a groove width of the second groove and that the widened portion has a length along the first groove which is longer than a length along the second groove.

18. The non-pneumatic tire according to claim 17, wherein the around contact surface includes a first ground contact surface on one side of a tire equator and a second ground contact surface on the other side of the tire equator such that each of the first ground contact surface and the second ground contact surface has the widened portion formed in a plurality and the hole formed in a plurality along a tire circumferential direction and that the plurality of widened portions in the first ground contact surface and the plurality of widened portions in the second ground contact surface are shifted from each other's positions in the tire circumferential direction.

19. The non-pneumatic tire according to claim 16, wherein the ground contact surface includes a first ground contact surface on one side of a tire equator and a second ground contact surface on the other side of the tire equator such that each of the first ground contact surface and the second ground contact surface has the widened portion formed in a plurality and the hole formed in a plurality along a tire circumferential direction and that the plurality of widened portions in the first ground contact surface and the plurality of widened portions in the second ground contact surface are shifted from each other's positions in the tire circumferential direction.

20. The non-pneumatic tire according to claim 1, wherein the ground contact surface includes a first ground contact surface on one side of a tire equator and a second ground contact surface on the other side of the tire equator such that each of the first around contact surface and the second ground contact surface has the widened portion formed in a plurality and the hole formed in a plurality along a tire circumferential direction and that the plurality of widened portions in the first ground contact surface and the plurality of widened portions in the second ground contact surface are shifted from each other's positions in the tire circumferential direction.

* * * * *